US011322022B2

(12) United States Patent
Wang et al.

(10) Patent No.: US 11,322,022 B2
(45) Date of Patent: May 3, 2022

(54) METHOD FOR INTERACTING TRAFFIC INFORMATION, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Ya Wang, Beijing (CN); Xuning Wang, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 146 days.

(21) Appl. No.: 16/669,052

(22) Filed: Oct. 30, 2019

(65) Prior Publication Data
US 2020/0135023 A1    Apr. 30, 2020

(30) Foreign Application Priority Data

Oct. 30, 2018  (CN) .......................... 201811279046.6

(51) Int. Cl.
*G08G 1/0967* (2006.01)
*B60W 40/09* (2012.01)
(Continued)

(52) U.S. Cl.
CPC ....... *G08G 1/096716* (2013.01); *B60W 40/09* (2013.01); *B60W 50/12* (2013.01); *G08G 1/096741* (2013.01); *G08G 1/096775* (2013.01); *G08G 1/096783* (2013.01); *G08G 1/096791* (2013.01); *B60W 2050/146* (2013.01)

(58) Field of Classification Search
CPC combination set(s) only.
See application file for complete search history.

(56) References Cited

U.S. PATENT DOCUMENTS 10,035,514 B1 *  7/2018  Lambert ............... B60W 40/09
2008/0021600 A1    1/2008  Sohr
(Continued)

FOREIGN PATENT DOCUMENTS

CN           2207960 Y       9/1995
CN           2281921 Y       5/1998
(Continued)

OTHER PUBLICATIONS

English translation of Sorokin, DE 102016216680 (Year: 2016).*
(Continued)

*Primary Examiner* — Nabil H Syed
*Assistant Examiner* — Cal J Eustaquio
(74) *Attorney, Agent, or Firm* — Lathrop GPM LLP

(57) ABSTRACT

The embodiments of the present disclosure provide a method and an apparatus for interacting traffic information, a device and a computer-readable storage medium. The method includes: in response to a first vehicle being about to overtake a second vehicle, sending overtake-preceding indicating information to the second vehicle; detecting whether the driver of the second vehicle makes a first response to the overtake-preceding indicating information; and in response to not detecting the first response made by the driver, sending additional indication information to the second vehicle.

17 Claims, 4 Drawing Sheets

(51) Int. Cl.
*B60W 50/12* (2012.01)
*B60W 50/14* (2020.01)

(56) References Cited

U.S. PATENT DOCUMENTS

| | | | | |
|---|---|---|---|---|
| 2009/0109014 | A1* | 4/2009 | Jones | B60Q 1/50 |
| | | | | 340/468 |
| 2012/0066011 | A1* | 3/2012 | Ichien | B60W 40/09 |
| | | | | 705/4 |
| 2013/0054089 | A1* | 2/2013 | Nordbruch | G08G 1/167 |
| | | | | 701/36 |
| 2013/0342368 | A1* | 12/2013 | Nathanson | G08G 1/0965 |
| | | | | 340/903 |
| 2018/0275747 | A1* | 9/2018 | Campbell | G06V 40/10 |
| 2018/0359811 | A1* | 12/2018 | Verzun | H04W 88/16 |

FOREIGN PATENT DOCUMENTS

| | | |
|---|---|---|
| CN | 2316187 Y | 4/1999 |
| CN | 2820617 Y | 9/2006 |
| CN | 105083291 A | 11/2015 |
| CN | 105644558 A | 6/2016 |
| CN | 105976457 A | 9/2016 |
| CN | 105976641 A | 9/2016 |
| CN | 106379233 A | 2/2017 |
| CN | 106415693 A | 2/2017 |
| CN | 206186888 U | 5/2017 |
| CN | 107273865 A | 10/2017 |
| CN | 107662559 A | 2/2018 |
| CN | 107867242 A | 4/2018 |
| CN | 108284845 A | 7/2018 |
| CN | 108528326 A | 9/2018 |
| CN | 108528331 A | 9/2018 |
| CN | 108549720 A | 9/2018 |
| CN | 108566247 A | 9/2018 |
| CN | 207909355 U | 9/2018 |
| CN | 108616306 A | 10/2018 |
| CN | 108710821 A | 10/2018 |
| DE | 102008040566 A1 | 1/2010 |
| DE | 102015201766 A1 | 8/2016 |
| DE | 102016216680 A1 | 3/2018 |
| KR | 20180102250 A | 9/2018 |

OTHER PUBLICATIONS

Chinese Patent Application No. 201811279046.6 Third Office Action dated Jan. 25, 2021, 10 pages.
Chinese Patent Application No. 201811279046.6 English translation of Third Office Action dated Jan. 25, 2021, 13 pages.
Chinese Patent Application No. 201811279046.6 English translation of Office Action dated Mar. 13, 2020, 15 pages.
Chinese Patent Application No. 201811279046.6 Office Action dated Mar. 13, 2020, 12 pages.
European Patent Application No. 19206153.9 extended Search and Opinion dated Apr. 1, 2020, 7 pages.

* cited by examiner

METHOD FOR INTERACTING TRAFFIC INFORMATION, DEVICE AND COMPUTER STORAGE MEDIUM

This application is based on and claims priority of Chinese Patent Application 201811279046.6, filed on Oct. 30, 2018, the entire contents of which are incorporated herein by reference.

FIELD

The present disclosure relates to an information interaction field, more particularly to a method for interacting traffic information, a device and a computer-readable storage medium.

BACKGROUND

With development of intelligentizing and networking of a vehicle, an interaction process of traffic information becomes more complicated by technologies such as driver assistance system, autonomous drive system. When a vehicle performs an overtaking operation on the road, the driver of the vehicle being overtaken may develop a dissatisfied (or even angry) mood, which may require interaction with the driver to pacify. Thus, when an autonomous vehicle performs the overtaking operation with regard to non-autonomous vehicle, abilities to interact with the driver of the vehicle to be overtaken and to pacify the mood of the driver may be required.

DISCLOSURE

Embodiments of the present disclosure provide a technical solution of interacting traffic information.

In a first aspect of the present disclosure, embodiments of the present disclosure provide a method for interacting traffic information, including: in response to a first vehicle being about to overtake a second vehicle, sending overtake-preceding indicating information to the second vehicle; detecting whether the driver of the second vehicle makes a first response to the overtake-preceding indicating information; and in response to not detecting the first response made by the driver of the second vehicle, sending additional indication information to the second vehicle.

In a second aspect of the present disclosure, embodiments of the present disclosure provide an apparatus for interacting traffic information, including: a first information sending module, configured to, in response to a first vehicle being about to overtake a second vehicle, send overtake-preceding indicating information to the second vehicle; a first response detecting module, configured to detect whether a driver of the second vehicle makes a first response to the overtake-preceding indicating information; and a second information sending module, configured to, in response to not detecting the first response made by the driver of the second vehicle, send additional indication information to the second vehicle.

In a third aspect of the present disclosure, embodiments of the present disclosure provide a device, including one or more processors and a memory for storing one or more programs. When the one or more programs are executed by the one or more processors, the one or more processors are caused to perform the method according to embodiments of the first aspect.

In a fourth aspect, embodiments of the present disclosure provide a computer-readable storage medium having a computer program stored thereon. When the computer program is executed by a processor, the method according to embodiments of the first aspect is performed.

It should be understood that, the above summary of the present disclosure is intended to describe key or important features of the present disclosure but not to limit the scope of the present disclosure. Other features in the present disclosure will become apparent in part from the following descriptions.

BRIEF DESCRIPTION OF THE DRAWINGS

These and other aspects and advantages of embodiments of the present disclosure will become apparent and more readily appreciated from the following descriptions made with reference to the drawings. The same or similar elements and the elements having same or similar functions are denoted by like reference numerals in the drawings.

EMBODIMENTS OF THE PRESENT DISCLOSURE

Figure 1:
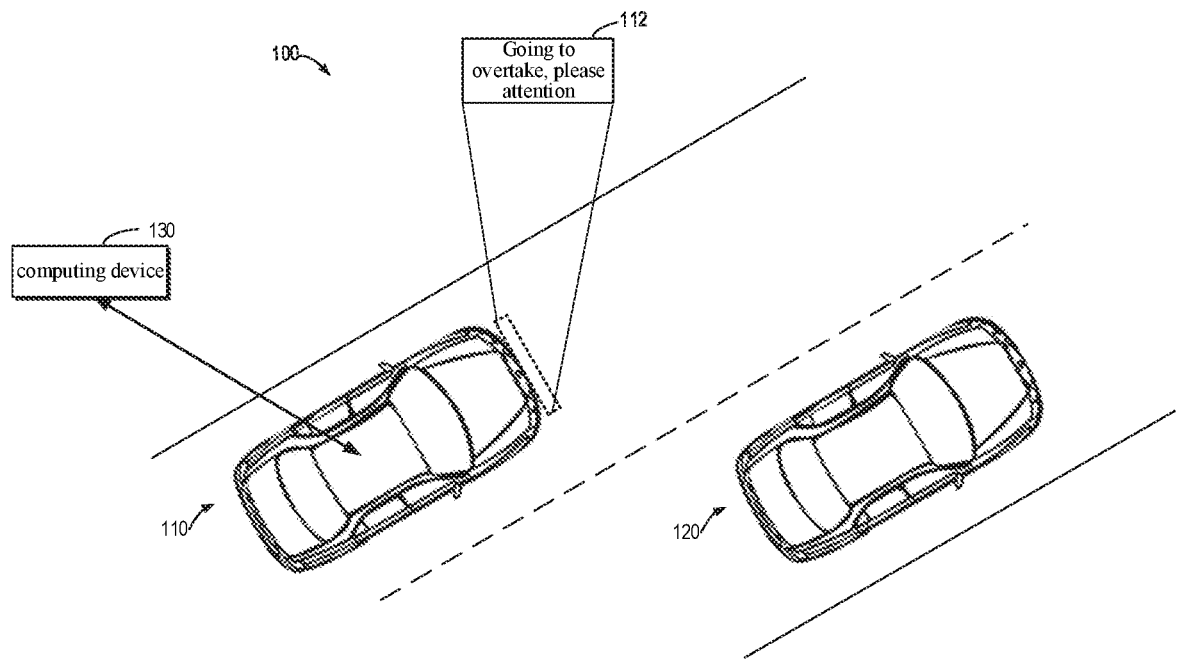
FIG. 1 is a schematic diagram of an example environment in which the embodiments of the present disclosure are realized.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

It should be further understood that, when used in the specification, terms "comprising" and/or "containing" specify the presence of stated features, operations, elements and/or components, but do not exclude the presence or addition of one or more other features, operations, elements, components and/or groups thereof. Terms "based on" should be understood as "at least partially based on". Reference throughout this specification to "an embodiment," or "this example," means "at least one embodiment". Terms such as "first" and "second" are used herein for describing different or same elements. Other implicit or explicit definitions may be contained in the following.

As mentioned above, during a process that an autonomous vehicle performs an overtaking operation, an interaction with the vehicle to be overtaken may be required. When the vehicle to be overtaken is an autonomous vehicle, a traditional information interaction method may be explained as follows, before the overtaking operation, the vehicle performing the overtaking operation sends an overtaking request to the vehicle to be overtaken, the vehicle to be overtaken may feedback response information allowing the overtaking operation in a normal condition, such that the overtaking operation may be performed. When the vehicle to be overtaken is an ordinary vehicle operated by a driver, the autonomous vehicle merely indicates the overtaking operation to be performed for the driver of the vehicle to be overtaken through a turn signal light. However, since the response information cannot be received from the vehicle to be overtaken, the autonomous vehicle cannot know whether the driver of the vehicle to be overtaken is aware of an overtake indication from the autonomous vehicle. Thus, if the driver of the vehicle to be overtaken is not aware of the overtake indication from the autonomous vehicle and the autonomous vehicle performs the overtaking operation, a traffic accident may be caused.

In addition, the overtaking operation of the autonomous vehicle may cause a road rage mood of the driver of the vehicle to be overtaken, while the autonomous vehicle cannot know whether the driver of the vehicle to be overtaken has the road rage mood, such that no pacifying action can be performed for the driver, which may cause potential safety hazard for road traffic.

Recently, significant progress has been made in driverless technology. More and more enterprises carry out development and production of the driverless vehicles. It may be anticipated that many more autonomous vehicles may appear on the road in the future. How to realize a traffic information interaction between an autonomous vehicle and a non-autonomous vehicle (also referred to as "ordinary vehicle" in this disclosure) is an urgent problem to be solved at present.

According to embodiments of the present disclosure, a technical solution of providing a traffic information interaction is proposed. In this technical solution, by detecting whether the driver of the vehicle to be overtaken is aware of the overtake indication from the vehicle performing the overtaking operation and reminding the driver again in other ways in response to detecting that the driver is not aware of the overtake indication, the overtake reminder for the driver of the vehicle to be overtaken may be realized. With this technical solution, further reminder strategy may be provided on the basis of an attention state of the driver of the vehicle to be overtaken with regard to the overtake reminder. In this way, the interaction between the autonomous vehicle and the non-autonomous vehicle may be more efficient and useful, and the information related to the vehicle to be overtaken may be acquired within a short interaction time, thus avoiding potential safety hazard caused by overtaking.

In the following text, the embodiments of the present disclosure will be described in detail with reference to the drawings. FIG. 1 shows a schematic diagram of an example traffic environment 100 in which the embodiments of the present disclosure are realized. In the example environment 100, a vehicle 110 is driving on the left side of a road while a vehicle 120 is driving on the right side of the road. In the example traffic embodiment 100, the vehicle 110 is performing the overtaking operation with regard to the vehicle 120.

In the context, the vehicles 110, 120 may be any type of vehicle capable of carrying people and/or item and moving through a power system such as an engine, including but not limited to a car, a truck, a bus, a motorbike, a limousine, a train or the like. The vehicle 110 may be a vehicle having a certain autonomous driving ability, which may be called as the autonomous vehicle. The vehicle 120 may be a vehicle without autonomous driving ability, which require a driver to operate the vehicle, and may be called as the ordinary vehicle.

The vehicle 110 may be coupled to a computing device 140 communicatively. Although the computing device 140 is illustrated as a single entity, the computing device 140 may be embodied in the vehicle 110. The computing device 140 may be an entity external to the vehicle 110, and may communicate with the vehicle 110 via a wireless network. The computing device 140 may be implemented as one or more computing devices, at least including a processor, a storage and other components generally existing in a general-purpose computer so as to realize functionalities such as computing, storage, communication, control or the like.

It should be understood that, the environment 100 illustrated in FIG. 1 is merely a specific example. According to actual situations, more or less, or different objects may exist in the environment 100. For example, one or more configurations of a road for driving of the vehicle, a position and a number of the vehicle on the road, a position and a number of a passerby, a relative position between the passerby and the vehicle and a traffic guiding facility may be different.

When the vehicle 110 is going to perform the overtaking operation with regard to the vehicle 120, the vehicle 110 needs to send overtake-preceding indicating information 112 to the vehicle 120. The overtake-preceding indicating information 112 is configured to transmit a overtake reminder to the vehicle 120. For example, in an example of FIG. 1, the vehicle 110 utilizes a front display screen to display the overtake-preceding indicating information 112, which may include text "Going to overtake, please attention". Such overtake-preceding indicating information 112 may indicate an intention to overtake of the vehicle 110 to the vehicle 120. Alternatively, a turn light may be used to indicate the overtake-preceding indicating information 112.

According to embodiments of the present disclosure, when the driver of the vehicle 120 is aware of the overtake-preceding indicating information 112 from the vehicle 110, the driver generally diverts line of sight to a rearview mirror of the vehicle 120. Therefore, the vehicle 110 may detect whether the driver of the vehicle 120 is aware of the overtake-preceding indicating information 112 from the vehicle 110 by detecting whether the driver of the vehicle 120 takes an action of turning face to the rearview mirror or takes an action of diverting line of sight to the rearview mirror. If the driver is not aware of the overtake-preceding indicating information 112, additional indication information is sent to the vehicle 120. As an example, the additional indication information may be different from the overtake-preceding indicating information 112. Thus, based on the response from the driver of the vehicle 120 to be overtaken, the reminder may be further sent to the driver, such that the traffic information interaction between the autonomous vehicle and the ordinary vehicle may be realized.

Figure 2A:
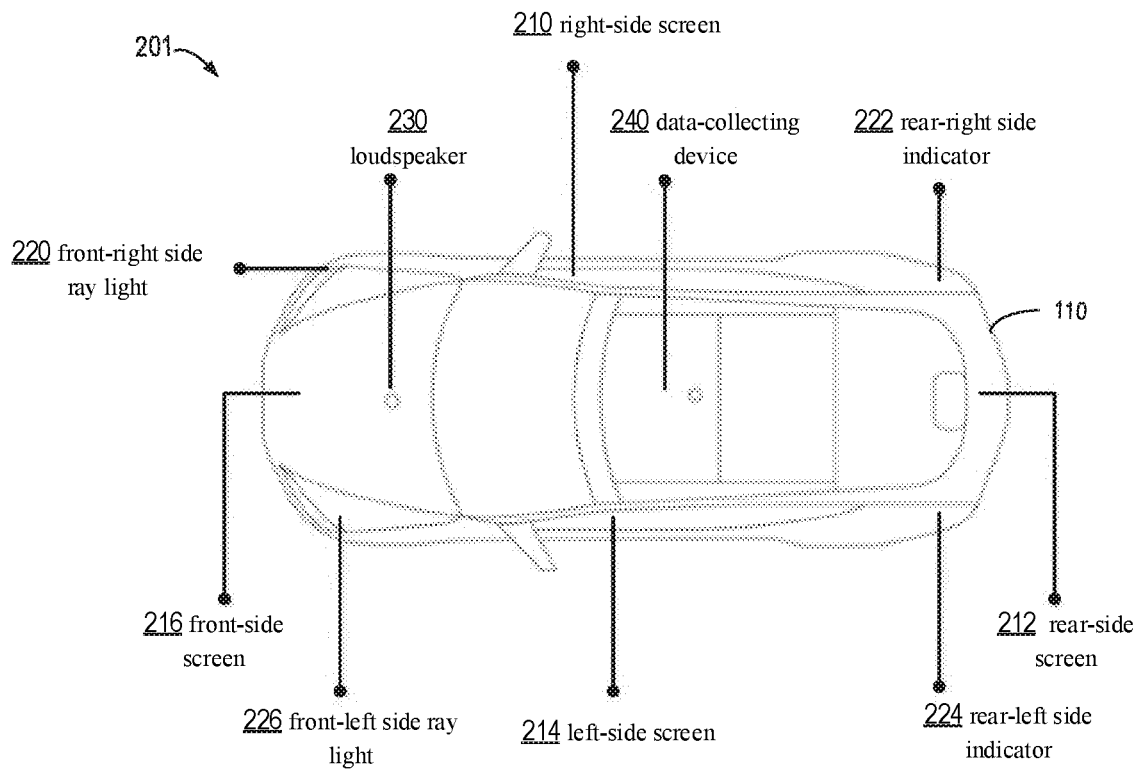
FIG. 2A is a top view of an example vehicle according to embodiments of the present disclosure.

Detailed content and presentation of the overtake-preceding indicating information 112 may further depends on a specific hardware configuration of the vehicle 110. Before describing the embodiments of the present disclosure in detail, an example of the hardware configuration of the vehicle 110 is explained with reference to FIGS. 2A-2B. FIG. 2A is a top view of an example of the vehicle 110 according to embodiments of the present disclosure. In this example, the vehicle 110 includes one or more display screens external to the vehicle. The display screen may include a right-side screen 210 and a left-side screen 214 installed on lateral sides of the vehicle 110, a rear-side screen 212 installed on a rear side of the vehicle 110, and a front-side screen 216 installed on a front side of the vehicle 110. The rear-side screen 212 may be clearly observed from a back view 202 of the vehicle 110 illustrated in FIG. 2B. The display screen may be any type of screen capable of displaying feedback information such as text, picture and/or animation. Additionally or alternatively, besides the screen illustrated in FIG. 2A, one or more other screens may be installed at other positions of the vehicle 110.

It can be seen from the top view 201 of the FIG. 2A, the vehicle 110 may further include one or more ray lights configured to emit light. The ray lights may be located at different positions of the vehicle 110, such as a front-right side ray light 220 and a front-left side ray light 226 illustrated in FIG. 2A. In addition, a rear-right side indicator 222 and a rear-left side indicator 226 illustrated in FIG. 2A may also be configured as the ray lights. The ray light may be configured to project predetermined picture or text on a road surface.

The vehicle 110 may further include one or more loudspeakers. As illustrated in FIG. 2A, the loudspeaker 230 is located at the forepart of the vehicle 110. It should be understood that, one or more loudspeakers may be located at other positions of the vehicle 110. The loudspeaker 230 may be configured to output audible information.

In addition to a device configured to output information, the vehicle 110 may further include one or more devices configured to collect data external to the vehicle, such as a data-collecting device 240 at the top of the vehicle 110. The data-collecting device 240 may be an image capturing device (such as a camera) and/or other types of sensors configured to detect data. It should be understood that, one or more data-collecting devices may be located at other positions of the vehicle 110.

An example of the hardware configuration of the vehicle 110 is described with reference to FIG. 2A and FIG. 2B. However, depending on a type of a specific configuration of the vehicle 110, a type, a number, an arrangement form of the hardware device configured to output the feedback information and collect data may be modified, which are not limited herein.

Figure 2B:
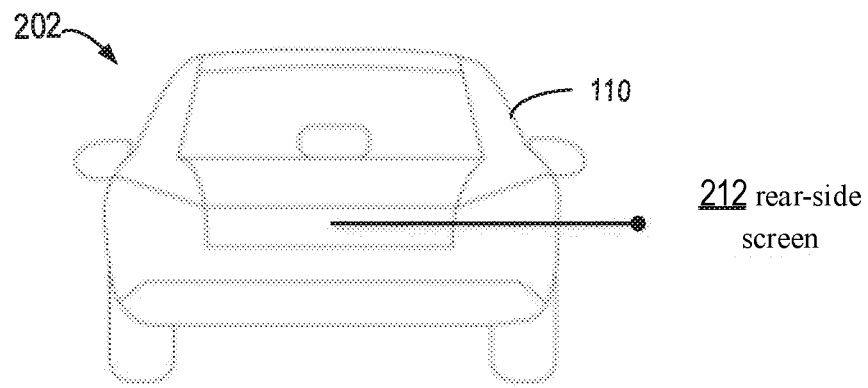
FIG. 2B is a back view of an example vehicle according to embodiments of the present disclosure.

Based on the hardware configurations illustrated in FIG. 2A and FIG. 2B, the example traffic environment 100 illustrated in FIG. 1 may be further improved.

Figure 3:
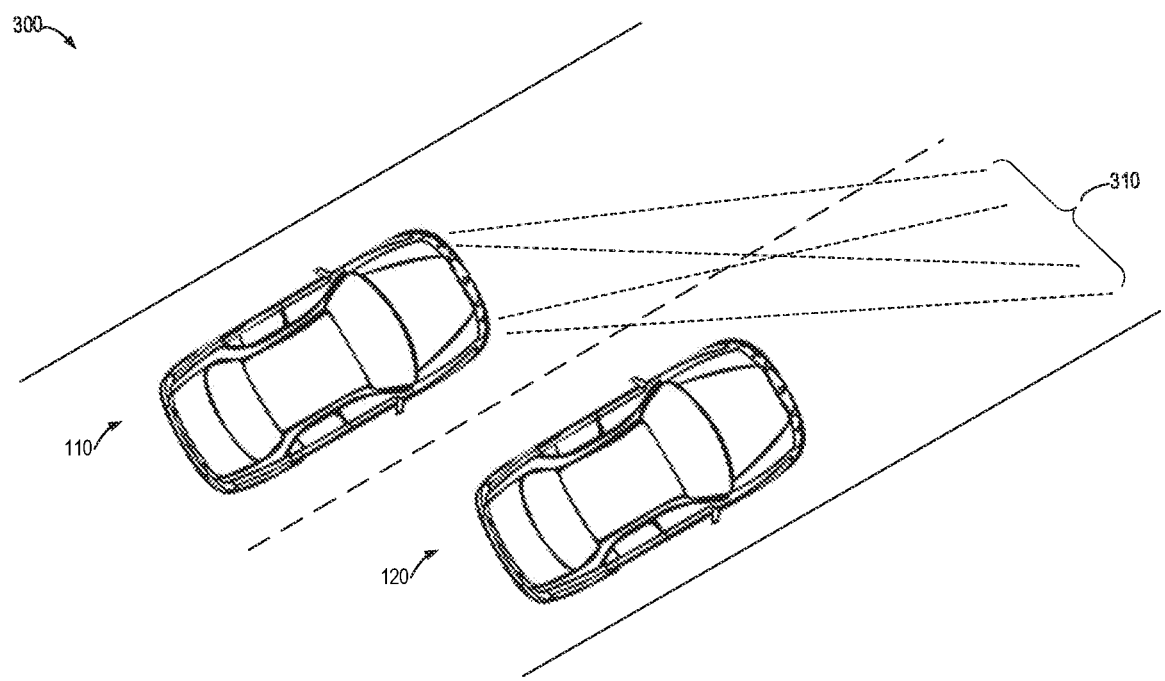
FIG. 3 is a schematic diagram of another example environment in which the embodiments of the present disclosure are realized.

FIG. 3 is a schematic diagram of another example environment in which the embodiments of the present disclosure are realized. In detail, FIG. 3 illustrates another implementation of sending additional reminder to the vehicle 120 to be overtaken under an overtake scene of FIG. 1. Similar to the scene illustrated in FIG. 1, in FIG. 3, the vehicle 110 is driving on the left side of the road, the vehicle 120 is driving on the right side of the road, and the vehicle 110 is performing the overtaking operation with regard to the vehicle 120. Differently, in an example environment 300, the vehicle 110 may detect whether the driver of the vehicle 120 takes an action of turning face to the rearview mirror or takes an action of diverting line of sight to the rearview mirror through the data-collecting device 240, so as to determine whether the driver of the vehicle 120 is aware of the overtake-preceding indicating information 112 from the vehicle 110. When determining that the driver of the vehicle 120 is not aware of the overtake-preceding indicating information 112 from the vehicle 110, the vehicle 110 may project a predetermined overtake path 310 on the forepart of the vehicle 120 through the front-right side ray light 220 and the front-left side ray light 226, so as to realize the additional reminder for the driver of the vehicle 120.

Figure 4:
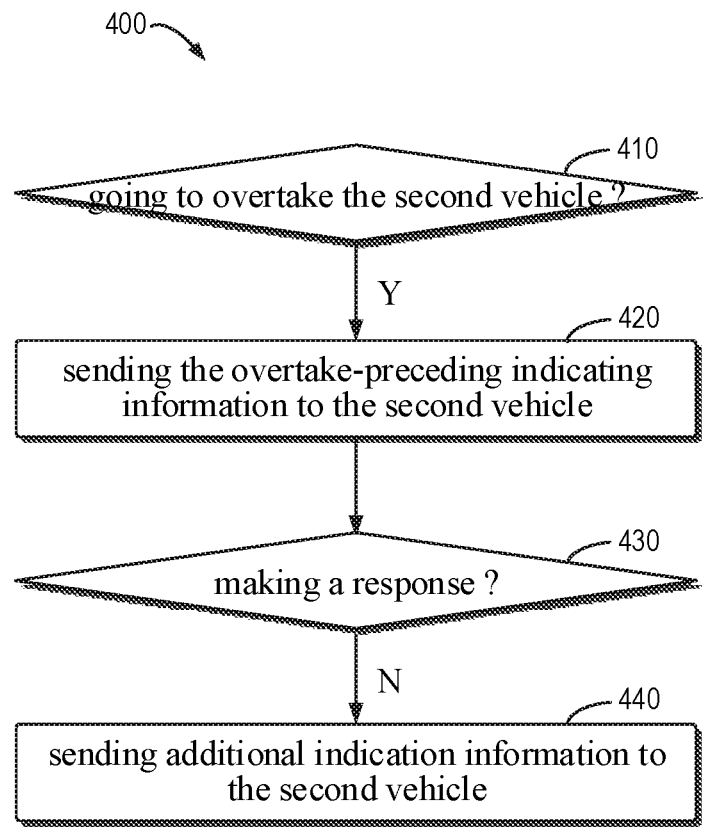
FIG. 4 is a flow chart of a method for interacting traffic information according to embodiments of the present disclosure.

The traffic information interaction between the vehicle 110 and the vehicle 120 will be described in more detail with reference to FIG. 4. FIG. 4 is a flow chart of a process 400 for interacting traffic information according to embodiments of the present disclosure. The process 400 may be executed by the computing device 130 illustrated in FIG. 1, the computing device 130 may be embodied in the vehicle 110 or may be a single device external to the vehicle 110. For ease of description, the process 400 will be described with reference to FIG. 1.

At block 410, the computing device 130 detects whether the vehicle 110 is going to overtake the vehicle 120. When detecting that the vehicle 110 is going to overtake the vehicle 120, an act at the block 420 is executed. At block 420, the overtake-preceding indicating information is sent to the vehicle 120. In the example of FIG. 1, the vehicle 110 displays the overtake-preceding indicating information 112 which includes "Going to overtake, please attention" using the front-side display screen. Such overtake-preceding indicating information 112 may indicate an intention to overtake of the vehicle 110 to the vehicle 120. Alternatively or additionally, a turn light may be used to indicate the overtake-preceding indicating information 112.

At block 430, it is detected whether the driver of the vehicle 120 makes a response to the overtake-preceding indicating information 112. The detections of corresponding actions may be implemented on the basis of technologies of recognizing the face and/or actions of the driver. In some embodiments, the computing device 130 may acquire real-time collected image information of the driver of the vehicle 120, and recognize the face and/or actions of the driver through a data analysis. The image information for analysis may be acquired by the data-collecting device 240 of the vehicle 110 in real time.

As an example, the data-collecting device 240 may be configured to collect an image of an external environment from one or more directions of the vehicle 110. In this example, the data-collecting device 240 may include one or more image collectors. Each image collector may be configured to collect images in different directions. The data-collecting device 240 may further include a panoramic image collecting device, which may collect the image from a wide angle. As an example, it is detected whether the driver of the vehicle 120 is aware of the overtake-preceding indicating information 112 from the vehicle 110 by detecting whether the driver of the vehicle 120 takes an action of turning face to the rearview mirror or takes an action of diverting line of sight to the rearview mirror. In detail, an image containing the head of the driver of the vehicle 120 may be acquired by the data-collecting device 240. Further, it may be detected whether the position relationship between the head of the vehicle and the rearview mirror of the vehicle 120 changes from may continuous images. When the position relationship changes, it may be determined that the driver is aware of the overtake-preceding indicating information 112. Through the above operations, further reminder strategy may be provided on the basis of an attention state of the driver of the vehicle 120 to be overtaken with regard to the overtake reminder. In this way, the interaction between the autonomous vehicle 110 and the ordinary vehicle 120 may be efficient and useful.

At block 440, in response to not detecting the response made by the driver, additional indication information is sent to the vehicle 120. According to the embodiments of the present disclosure, the additional indication information sent to the vehicle 120 may be different from the overtake-preceding indicating information. As an example, the additional indication information sent to the vehicle 120 may be voice indication information with a decibel greater than a predetermined decibel emitted by the loudspeaker 230. Alternatively or additionally, the additional indication information sent to the vehicle 120 may also be optical indication information (such as flicker) emitted by the right-side screen 210 (if the overtaking operation is performed from the right side, the optical indication information is emitted by the left-side screen 214). Preferably, the additional indication information sent to the vehicle 120 may be optical projection information emitted by at least one of the front-right side ray light 220 and the front-left side ray light 226. By means of the above various examples of "additional reminder", a success rate of reminding the driver of the vehicle to be overtaken to notice the incoming overtaking operation is improved greatly.

In the embodiment illustrated in FIG. 3, the vehicle 110 may project the predetermined overtake path 310 on the front road surface of the vehicle 120 through the front-right side ray light 220 and the front-left side ray light 226, so as to realize the overtake reminder for the driver of the vehicle 120. Alternatively or additionally, the vehicle 110 may further project the predetermined overtake reminder text or image information on the front road surface of the vehicle 120 through at least one of the front-right side ray light 220 and the front-left side ray light 226, so as to realize the overtake reminder for the driver of the vehicle 120.

In some embodiments of the present disclosure, firstly the front road surface of the vehicle 120 may be located by detecting the position of the vehicle 120, and then the light 310 of again indicating the driver is projected on the front road surface of the vehicle 120. Alternatively or additionally, projecting the light 310 of again indicating the driver on the front road surface of the vehicle 120 may include: generating the planned path for overtaking the vehicle 120 by the computing device 130, and projecting the light 130 on the front road surface of the vehicle 120 to depict lines of the planned path. In this way, the driver of the vehicle to be overtaken may know the overtake path for the incoming overtaking operation, such that the possible traffic accident may be avoided.

When the vehicle 110 performs the overtaking operation with regard to the vehicle 120, it is further required to detect whether the driver has the road rage mood due to the overtaking operation. In some embodiments, it may be determined whether the driver has the road rage mood based on the above-mentioned response of the driver made to the overtake-preceding indicating information 112. If the driver has the road rage mood, overtake-concurring pacifying information may be sent to the vehicle 120. As an example, the overtake-concurring pacifying information may be broadcasted to the driver of the vehicle 120 through the left-side screen 214 or the right-side screen 210 oriented to one side of the vehicle 120. Alternatively or additionally, the overtake-concurring pacifying information may be projected on the forepart of the vehicle 120 by at least one of the front-right side ray light 220 and the front-left side ray light 226. In addition, audio information may be broadcasted to the driver of the vehicle 120 via the loudspeaker 230 to pacify the driver. As an example, the overtake-concurring pacifying information may be "Emergency situation, please forgive me". In this way, the information interaction between the autonomous vehicle 110 and the driver of the vehicle to be overtaken may be realized, such that the road rage mood of the driver may be effectively calmed down.

In some embodiments, when the vehicle 110 performs the overtaking operation with regard to the vehicle 120, it is further required to detect whether the driver of the vehicle 120 makes the response to the vehicle 110 during the vehicle 110 overtaking the vehicle 120. If the response to the vehicle 120 is detected, it is determined whether the driver has the road rage mood based on the response. Further, if the driver has the road rage mood, the overtake-concurring pacifying information is sent to the vehicle 120. A specific embodiment of sending the overtake-concurring pacifying information is described above.

In some embodiments, the response to the vehicle 110 includes at least one of face recognition information of the driver; action recognition information of the driver and voice recognition information of the driver. As an example, the face recognition information of the driver of the vehicle 120 may be detected by the data-collecting device 240 to determine whether the driver has a fretful expression or anger expression (for example, frowning). As another example, the action recognition information of the driver of the vehicle 120 is detected by the data-collecting device 240 to determine whether the driver takes an action of patting a steering wheel or an action of opening or closing mouth. As a further example, the voice recognition information of the driver of the vehicle 120 is detected by the data-collecting device 240 to determine whether the driver calls out.

When the vehicle 110 finishes the overtaking operation with regard to the vehicle 120, the vehicle 110 may send the overtake-following thanking information to the vehicle 120. As an example, the vehicle 110 may broadcast the thanking information to the vehicle 120 through the rear-side screen 212. As another example, the vehicle 110 may further broadcast the thanking information to the vehicle 120 through the loudspeaker 230.

In the above, the process of further indicating the driver based on whether the driver of the vehicle 120 to be overtaken is aware of the overtake-preceding indicating information under some example scenes has been described. However, it should be understood that, the description of these scenes merely explains the embodiments of the present disclosure by example. Depending on the actual requirements, under different or similar scenes, different indicating information may be selected to maximally ensure smooth execution of the overtaking operation. It should be noted that, the vehicle 110 may further be the ordinary vehicle of the driver, and have the above-mentioned advantages.

Figure 5:
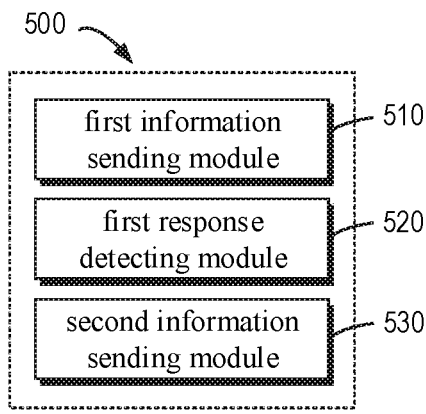
FIG. 5 is a block diagram of an apparatus for interacting traffic information according to embodiments of the present disclosure.

FIG. 5 is a block diagram of an apparatus 500 for interacting traffic information according to embodiments of the present disclosure. The apparatus 500 may be included in a computing device 130 shown in FIG. 1 or may be implemented as the computing device 130. As illustrated in FIG. 5, the apparatus 500 includes a first information sending module 510, configured to, in response to a first vehicle being about to overtake a second vehicle, send overtake-preceding indicating information to the second vehicle. The apparatus 500 further includes a first response detecting module 520, configured to detect whether a driver of the second vehicle makes a first response to the overtake-preceding indicating information. The apparatus 500 further includes a second information sending module 530, configured to, in response to not detecting the first response made by the driver, send additional indication information to the second vehicle.

In some embodiments, the second information sending module 530 may include: a locating module, configured to locate a road surface in front of the second vehicle by detecting a position of the second vehicle; and a projecting module, configured to project light on the road surface.

In some embodiments, the projecting module may further include: a planned path generating module, configured to generate a planned path for overtaking the second vehicle; and a line depicting module, configured to project light on the road surface to depict lines of the planned path.

In some embodiments, the apparatus 500 may further include: a first determining module, configured to, in response to detecting the first response made by the driver, determine whether the driver has a road rage mood based on the first response; and a third information sending module, configured to, in response to determining that the driver has the road rage mood, send overtake-concurring pacifying information to the second vehicle.

In some embodiments, the apparatus 500 may further include: a second response detecting module, configured to detect whether the driver of the second vehicle makes a second response to the first vehicle during a process that the first vehicle is overtaking the second vehicle; a first determining module, configured to, in response to detecting the second response made to the first vehicle, determine whether the driver has a road rage mood based on the second response; and a third information sending module, configured to, in response to determining that the driver has the road rage mood, send overtake-concurring pacifying information to the second vehicle.

In some embodiments, the second response to the first vehicle comprises at least one of: face recognition information of the driver; action recognition information of the driver and voice recognition information of the driver.

In some embodiments, the first determining module may further include at least one of: a first information detecting module, configured to detect face recognition information of the driver to determine whether the driver has a fretful expression or anger expression; a second information detecting module, configured to detect action recognition information of the driver to determine whether the driver takes an action of patting a steering wheel or an action of opening or closing mouth; and a third information detecting module, configured to detect voice recognition information of the driver to determine whether the driver calls out.

In some embodiments, the first response detecting module 520 may further include: an image acquiring module, configured to acquire an image of head of the driver; and a position relationship detecting module, configured to detect a position relationship between the head of the driver and a rearview mirror of the second vehicle in the image.

In some embodiments, the apparatus 500 may further include: a fourth information sending module, configured to, in response to that the first vehicle overtakes the second vehicle, send overtake-following thanking information.

Figure 6:
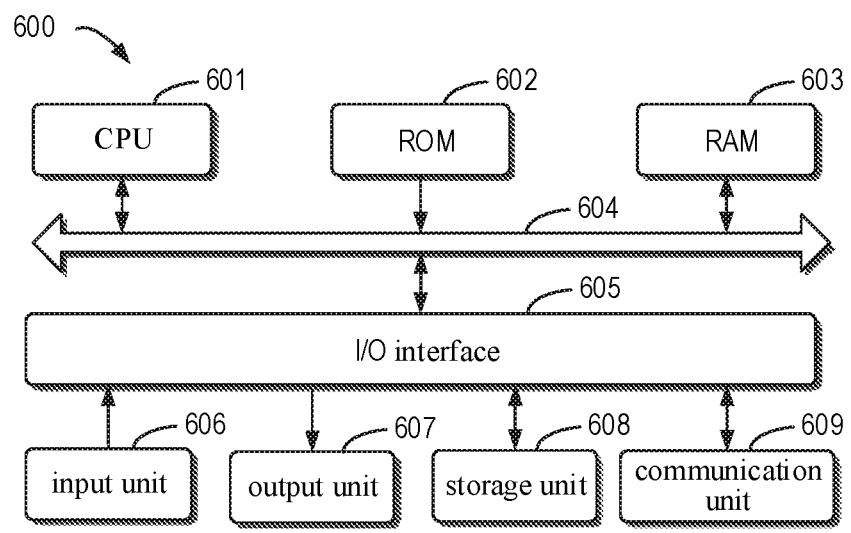
FIG. 6 is a schematic diagram of a computing device according to embodiments of the present disclosure.

FIG. 6 is a schematic diagram of a device 600 according to embodiments of the present disclosure. The device 600 may be used to implement the computing device 130 shown in FIG. 1. As illustrated in FIG. 6, the device 600 includes a computing unit 601 that may perform various appropriate actions and processing according to computer program instructions stored in a read-only memory (ROM) 602 or computer program instructions loaded into a random access memory (RAM) 603 from a storage unit 608. The RAM 603 may further store various programs and data required for the operation of the device 600. The computing unit 601, the ROM 602 and the RAM 603 are connected to each other via a bus 604. An input/output (I/O) interface 605 is also connected to the bus 604.

A plurality of components in the device 600 are connected to the I/O interface 605, including an input unit 606, such as a keyboard, a mouse or the like; an output unit 607, such as various types of displays, loudspeakers or the like; the storage unit 608, such as a magnetic disk, an optical disk or the like; and a communication unit 609, such as a network card, a modem, a wireless communication transceiver or the like. The communication unit 609 allows the device 600 to exchange information/data with other devices over a computer network such as the Internet and/or various telecommunication networks.

The processing unit 601 performs the various methods (such as process 300) and processes described above. For example, in some embodiments, the process 300 may be implemented as computer software programs, which are tangibly embodied in a machine-readable medium, for example the storage unit 608. In some embodiments, some or all of the computer programs may be loaded and/or installed onto the device 600 through the ROM 602 and/or the communication unit 609. When the computer programs are loaded into the RAM 603 and executed by the computing unit 601, one or more steps of the above-mentioned process 300 may be performed. Alternatively, in other embodiments, the CPU 601 may be configured to perform the process 300 by any other appropriate means (for example, by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of some embodiments of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of some embodiments of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical storage device, magnetic storage device, or any suitable combination of the foregoing.

In addition, although operations are described in a specific order, this should not be understood that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for interacting traffic information, comprising:
   in response to a first vehicle being about to overtake a second vehicle, sending overtake-preceding indicating information to the second vehicle;
   detecting whether a driver of the second vehicle makes a first response to the overtake-preceding indicating information;
   in response to not detecting the first response made by the driver of the second vehicle, sending additional indication information to the second vehicle;
   detecting whether the driver of the second vehicle makes a second response to the first vehicle during a process that the first vehicle is overtaking the second vehicle;
   in response to detecting the second response made to the first vehicle, determining whether the driver has a road rage mood based on the second response; and
   in response to determining that the driver has the road rage mood, sending overtake-concurring pacifying information to the second vehicle.

2. The method of claim 1, wherein sending the additional indication information to the second vehicle comprises:
   locating a road surface in front of the second vehicle by detecting a position of the second vehicle; and
   projecting light on the road surface.

3. The method of claim 2, wherein, projecting light on the road surface comprises:
   generating a planned path for overtaking the second vehicle; and
   projecting light on the road surface to depict lines of the planned path.

4. The method of claim 1, further comprising:
   in response to detecting the first response made by the driver, determining whether the driver has a road rage mood based on the first response; and
   in response to determining that the driver has the road rage mood, send overtake-concurring pacifying information to the second vehicle.

5. The method of claim 1, wherein, the second response to the first vehicle comprises at least one of: face recognition information of the driver; action recognition information of the driver and voice recognition information of the driver.

6. The method of claim 1, wherein determining whether the driver has a road rage mood comprises at least one of:
   detecting face recognition information of the driver to determine whether the driver has a fretful expression or anger expression;
   detecting action recognition information of the driver to determine whether the driver takes an action of patting a steering wheel or an action of opening or closing mouth; and
   detecting voice recognition information of the driver to determine whether the driver calls out.

7. The method of claim 1, wherein, detecting whether the driver of the second vehicle makes the first response to the overtake-preceding indicating information comprises:
   acquiring an image of head of the driver; and
   detecting a position relationship between the head of the driver and a rearview mirror of the second vehicle in the image.

8. The method of claim 1, further comprising:
   in response to that the first vehicle overtakes the second vehicle, sending overtake-following thanking information.

9. An electronic device, comprising:
   one or more processors;
   a memory for storing one or more programs;
   wherein when the one or more programs are executed by the one or more processors, the one or more processors are caused to perform the method for interacting traffic information, comprising:
   in response to a first vehicle being about to overtake a second vehicle, sending overtake-preceding indicating information to the second vehicle;
   detecting whether a driver of the second vehicle makes a first response to the overtake-preceding indicating information;
   in response to not detecting the first response made by the driver, sending additional indication information to the second vehicle;
   detecting whether the driver of the second vehicle makes a second response to the first vehicle during a process that the first vehicle is overtaking the second vehicle;
   in response to detecting the second response made to the first vehicle, determining whether the driver has a road rage mood based on the second response; and
   in response to determining that the driver has the road rage mood, sending overtake-concurring pacifying information to the second vehicle.

10. The electronic device of claim 9, wherein, sending the additional indication information to the second vehicle comprises:
    locating a road surface front of the second vehicle by detecting a position of the second vehicle; and
    projecting light on the road surface.

11. The electronic device of claim 10, wherein, projecting light on the road surface comprises:
    generating a planned path for overtaking the second vehicle; and
    projecting light on the road surface to depict lines of the planned path.

12. The electronic device of claim 9, wherein the method further comprises:
    in response to detecting the first response made by the driver, determining whether the driver has a road rage mood based on the first response; and
    in response to determining that the driver has the road rage mood, send overtake-concurring pacifying information to the second vehicle.

13. The electronic device of claim 9, wherein, the second response to the first vehicle comprises at least one of: face recognition information of the driver;
    action recognition information of the driver and voice recognition information of the driver.

14. The electronic device of claim 9, wherein determining whether the driver has a road rage mood comprises at least one of:
  detecting face recognition information of the driver to determine whether the driver has a fretful expression or anger expression;
  detecting action recognition information of the driver to determine whether the driver takes an action of patting a steering wheel or an action of opening or closing mouth; and
  detecting voice recognition information of the driver to determine whether the driver calls out.

15. The electronic device of claim 9, wherein, detecting whether the driver of the second vehicle makes the first response to the overtake-preceding indicating information comprises:
  acquiring an image of head of the driver; and
  detecting a position relationship between the head of the driver and a rearview mirror of the second vehicle in the image.

16. The electronic device of claim 9, wherein the method further comprises:
  in response to that the first vehicle overtakes the second vehicle, sending overtake-following thanking information.

17. A non-transitory computer-readable storage medium having a computer program stored thereon, wherein, when the computer program is executed by a processor, the processor performs the method for interacting traffic information, comprising:
  in response to a first vehicle being about to overtake a second vehicle, sending overtake-preceding indicating information to the second vehicle;
  detecting whether a driver of the second vehicle makes a first response to the overtake-preceding indicating information;
  in response to not detecting the first response made by the driver, sending additional indication information to the second vehicle;
  detecting whether the driver of the second vehicle makes a second response to the first vehicle during a process that the first vehicle is overtaking the second vehicle;
  in response to detecting the second response made to the first vehicle, determining whether the driver has a road rage mood based on the second response; and
  in response to determining that the driver has the road rage mood, sending overtake-concurring pacifying information to the second vehicle.

* * * * *